United States Patent Office
3,679,667
Patented July 25, 1972

3,679,667
ESTERS OF 3-(2,2-TETRAMETHYLENE ETHENYL)-2,2 - DIMETHYLCYCLOPROPANECARBOXYLIC ACID
Wayne I. Fanta, Colerain Township, Hamilton County, Ohio, assignor to The Procter & Gamble Company, Cincinnati, Ohio
No Drawing. Filed Mar. 27, 1970, Ser. No. 23,513
Int. Cl. C07d 5/34
U.S. Cl. 260—240 R   10 Claims

ABSTRACT OF THE DISCLOSURE

Described are esters of certain carbocyclic alcohols with 3-(2,2-tetramethylene ethenyl) - 2,2 - dimethylcyclopropanecarboxylic acid and a method for preparing same in the transisomeric form. These esters possess unique insecticidal properties and are useful as such in home, garden and agricultural applications.

BACKGROUND OF THE INVENTION

This invention relates to novel insecticidal compounds, to a process for preparing same in the trans-form and to insecticidal compositions containing said compounds as an essential active ingredient.

Current trends in the chemical control of insects call for inherently safer materials which degrade very rapidly to non-toxic substances once their purpose is accomplished. The safety of the widely used chlorinated hydrocarbons, notably DDT, is currently under question largely because of their poor biodegradability and concomitant persistence. Accordingly, there is a great demand for alternative broad spectrum insecticides which are suitable for the high volume usage entailed in agricultural applications. At the same time it is necessary for new insecticides to exhibit a low order of toxicity to warm-blooded animals. Of the several insecticide classes which demonstrate low mammalian toxicity and good biodegradability, it has long been recognized that pyrethrum, a naturally occurring insecticidal mixture, possesses these desirable properties. In addition to the safety advantages, this natural mixture yields rapid knock-down and kill of a broad spectrum of insects; however, it is unstable to light, air, and heat, and is very expensive. The most active component of pyrethrum is pyrethrin I and a number of analogous compounds have been proposed for insecticidal use. Allethrin, the most widely used synthetic pyrethrin-like insecticide, while more stable to light and heat than pyrethrum, is nevertheless expensive, a defect which is compounded by the fact that this substance is not synergized by the low cost synergizing agents such as piperonyl butoxide which are typically used in insecticidal compositions. Because of instability, high cost and limited supply, the use of pyrethrum and pyrethrin-like insecticides in garden and agricultural applications has been precluded or seriously limited.

At the same time, it is well known that certain insects, in time, become immune to the insecticidal properties of various chemical agents. To be efficient an insecticide should be able to resist detoxification by the insect. The biological mechanism whereby insects are capable of detoxifying the various types of insecticidal compounds is not known. However, it has been suggested that in compounds which are analogous to pyrethrin, e.g., allethrin, one mode of detoxification may involve oxidation of one or both of the methyl groups on the methylpropenyl side chain of the chrysanthemic acid moiety present in that compound. Additionally, it is possible that, as with other biological systems, insects may in time develop new bio- genetic mechanisms capable of detoxifying any particular insecticidal compound. In any event, it is desirable to have included in the insecticidal armamentarium, compounds which may be utilized once a given class of insects is found which no longer respond to conventional insecticidal compounds.

It is therefore an object of this invention to provide novel insecticidal compounds which are biodegradable, effect rapid knock-down and kill of a broad spectrum of insects, possess low mammalian toxicity, and are less susceptible to detoxification by insects than is pyrethrum.

It is a still further object of this invention to provide a novel synthesis of the transform of insecticidal esters of 3-(2,2-tetramethylene ethenyl)-2,2-dimethylcyclopropanecarboxylic acids. These and other objects are obtained by the present invention as will become apparent from the following disclosure.

DETAILED DESCRIPTION OF THE INVENTION

The novel compounds of the present invention have the formula:

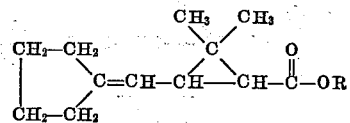

wherein R is a radical selected from the group consisting of

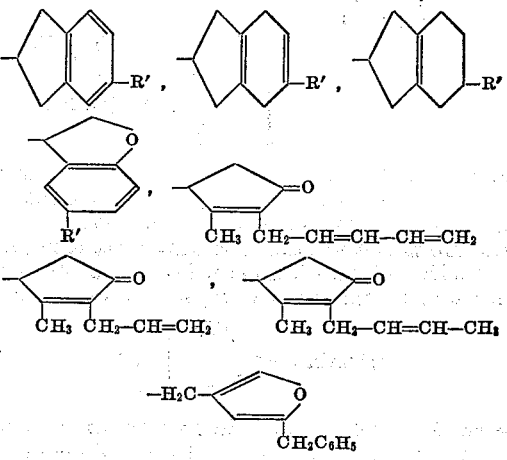

and wherein R' is a member selected from the group consisting of hydrogen, halogen, short-chain alkyl (e.g., methyl, ethyl, propyl), and short-chain alkoxy (e.g., methoxy, ethoxy, propoxy), aryl, halogen, $NO_2$, $NH_2$, and $COCH_3$. Thus, the esters of 3-(2,2-tetramethylene ethenyl)-2,2-dimethylcyclopropanecarboxylic acid with allethrolone, cinerolone, pyrethrolone, 2-indanol, di- and tetrahydro-2-indanol, 5-substituted -2-indanols, 3-coumaranol, 5-substituted-3-coumaranols and 5-benzyl-3-furfuryl methanol are compounds encompassed by the present invention. Especially preferred are the esters of 3-(2,2-tetramethylene ethenyl)-2,2-dimethylcyclopropane carboxylic acid and allethrolone, 2-indanol, 3-coumaranol and 5-benzyl-3-furfuryl methanol.

The unique structural features of the cyclopropyl carboxylic acids of this invention results in the formulation of geometrical isomers of the cis-trans-type. It has been recognized that in most cases the trans acids afford more active insecticidal compositions when esterified with a given alcohol than do the cis acids However, separation of the trans from the cis form of the acid or acid esters is difficult to accomplish economically. However, it has been found that the intermediate aldehyde ester mixture formed through ozonalysis of cis-trans-ethyl chrysanthemate during the synthesis of the novel acids of this invention is easily separable into its cis- and trans-isomers by simple distillation. As later described, this aldehyde ester is suitable for conversion into the trans form of the acids of this invention and thence to their insecticidal ester compounds having the acid portion in the trans form.

The compounds of this invention are prepared by esterification of 3-(2,2-tetramethylene ethenyl)-2,2-dimethylcyclopropanecarboxylic acid with the desired alcohol. The 3-(2,2-tetramethylene ethenyl)-2,2-dimethylcyclopropanecarboxylic acid is prepared according to the general reaction sequence below:

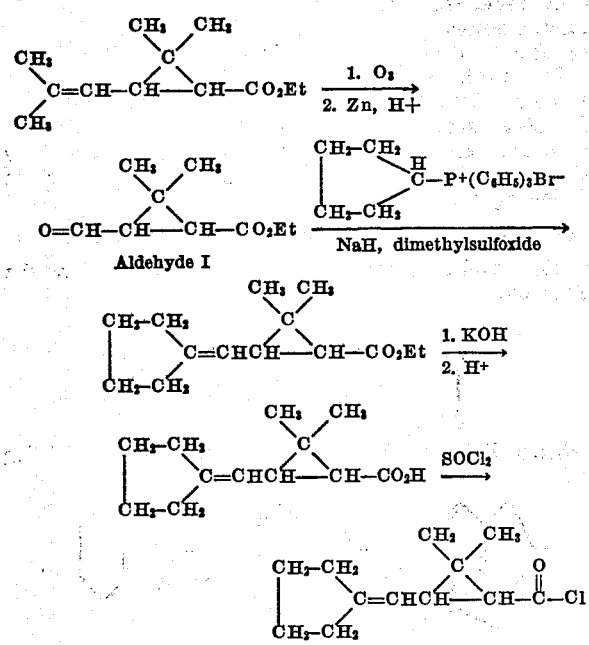

A prefered method of preparation of 3-(2,2-tetramethylene ethenyl)-2,2-dimethylcyclopropanecarboxylic acid comprises oxidation of commercially available ethyl chrysanthemate with ozone and subsequent reduction of the ozonide to form Aldehyde I. Reaction of Aldehyde I with the ylid form of the Wittig reagent of the type

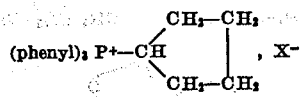

wherein X=halogen, results in an ester having the desired substitution for the isopropyl group of the isobutylene unit. This ester is converted to the acid by standard procedures. In the practice of the process aspect of this invention, the Aldehyde I can be separated into its cis and trans isomers by distillation and the trans isomer is then treated with the above-described Wittig agent to provide the trans acid suitable for the use in this invention. Specifically, 3-(2,2-tetramethylene ethenyl)-2,2-dimethylcyclopropanecarboxylic acid is prepared as follows:

PREPARATION OF TRANS-3-(2,2-TETRAMETHYLENE ETHENYL) - 2,2 - DIMETHYLCYCLOPROPANECARBOXYLIC ACID

Step 1.—Cis/trans-3-carboethoxy - 2,2 - dimethylcyclopropanecarboxaldehyde (Aldehyde I): A solution of 42.4 g. of ethyl chrysanthemate in 24 ml. MeOH and 12 ml. $H_2O$ was subjected to the ozonalysis procedure of Eschinasi, U.S. Pat. 3,023,244, for 6 hrs. at 0.03 cu. ft./min. The total was added to 13 g. zinc dust in 100 ml. $H_2O$ and 10 ml. benzene, stirred, treated 20 min. with 32 g. 62% $H_2SO_4$ stirred 10 min. after addition and extracted with ether. The ether was washed with 2% NaOH, sat. $NaHCO_3$, sat. NaI, brine until neutral and dried ($MgSO_4$). After removal of low boiling solvents, the colorless residual oil was fractionally distilled on an 18″ spinning band column yielding: trans-3-carboethoxy-2,2-dimethylcyclopropanecarboxaldehyde: B.P. 54–61° (0.55 mm.); IR(neat) 3.34, 5.78, 5.85, 8.49μ; nmr ($CCl_4$) τ 0.0 (s, 1, —CHO), 5.36 (q, 2, J=6 Hz., —$OCH_2CH_3$), 7.0 (s, 2, >CH—), 8.7 and 8.74 [2s, 6, >$C(CH_3)_2$], 8.78 (t, 3, J=6 Hz, —$OCH_2CH_3$); glc indicated no less than 97% purity. Continued distillation gave cis-3-carboethoxy - 2,2 - dimethylcyclopropanecarboxaldehyde: B.P. 61° (0.55 mm.) —55° (0.45 mm.); IR (neat) 3.38, 5.78, 5.87, 8.35μ; nmr ($CCl_4$) τ 0.3 (d, 1, J=6 Hz, —CHO), 5.9 (q, 2, J=6.5 Hz, —$OCH_2CH_3$), 7.88 (d, 1, J=8 Hz, >CH—$CO_2C_2H_5$), 8.2 (m, 1, CH—CHO), 8.47 [s, 6, >$C(CH_3)_2$], 8.74 (t, 3, J=6 Hz., —$OCH_2CH_3$); glc indicated approx. 85% purity.

Step 2.—Trans-ethyl 3-(2,2-tetramethylene ethenyl)-2,2-dimethylcyclopropanecarboxylate: A mixture of 3.25 g. of NaH (60% mineral oil dispersion) in 125 ml. dry DMSO was blanketed with argon and heated at 75° C. for 1 hour. The reaction was cooled to 5–10° C. and charged with 32.4 g. of triphenylcyclopentylphosphonium bromide prepared according to Ramirez et al., J. Amer. Chem. Soc., 79, 67 (1957), and stirred for 30 min. while warming to room temperature. A solution of 4.5 g. of trans-3-carboethoxy - 2,2 - dimethylcyclopropanecarboxaldehyde in 65 ml. of dry DMSO was added and the resulting reaction stirred at room temperature for 3 hours, poured into brine and extracted with pentane. The combined pentane extracts were washed with $H_2O$, dried ($MgSO_4$) and concentrated to yield 8 g. of white solid. This was eluted from 100 g. of Florisil with 300 ml. 10% ether/hexane to afford 5.33 g. of colorless liquid which was distilled giving 4.63 g. (81%) of product: B.P. 65–67° (0.2 mm.); (neat) 3.38, 5.79, 8.49, 8.70μ; nmr ($CCl_4$) τ 5.02 (m, 1, —CH=), 5.98 (g. 4, J= 8 Hz., —$OCH_2CH_3$),

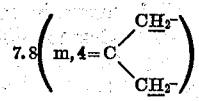

8.4 (m, 4, 2-$CH_2$—), 8.50 (t, 3, J=6 Hz., —$OCH_2CH_3$), 8.50 and 8.70 [2s, 6, >$C(CH_3)_2$]; mass spectrum parent ion, m/e 222.

Step 3.—Trans-3-(2,2-tetramethylene ethenyl)-2,2-dimethylcyclopropanecarboxylic acid: A solution of 4.6 g. of trans ethyl 3-(2,2-tetramethylene ethenyl)-2,2-dimethylcyclopropanecarboxylate in 65 ml. 95% EtOH was saponified in standard fashion by heating with KOH followed by an acid work-up. Work-up afforded 4.4 g. of acid which was suitable for further use.

Alternatively, Aldehyde I is not separated into its cis- and trans-isomers in the above process but is directly alkylated with the Wittig reagent to afford the cis-trans-acid and, thence, the cis-trans-acid chloride mixture.

The alcohols used in the preparation of the compounds of this invention are prepared as follows:

(I) 2-indanols: Commercially available 2-indanone is reduced with lithium aluminum hydride to provide the parent alcohol, 2-indanol, according to the method of Hückel and Bollig, Chem. Ber., 86, 1137 (1953). The partially reduced 2-indanols are prepared by the well-known Birch-type reductions. Likewise, various substituted 2-indanones having functional groups R', as previously noted, are reduced to the respective 5-substituted-2-indanols; for example, 5-substituted indanols such as 5-ethyl, 5-methoxy, 5-nitro and 5-acetyl indanols may be prepared according to the procedures of Inamoto et al., Can. Jour. Chem., 45, 1185, 1192 (1967), and reduced with lithium aluminum hydride to the alcohols as described supra. The following specific 2-indanols are prepared in this manner.

(a) 2-indanol: A solution of commercial 2-indanone (5 g., 3.78×$10^{-2}$ mol.) in ether (50 ml.) is added dropwise over a 40 minute period to a stirred suspension of lithium aluminum hydride (1.44 g., 3.78×$10^{-2}$ mol.) in ether (50 ml.). The resultant mixture is stirred at reflux for 16 hours. The reaction mixture is cooled and 1 N sodium hydroxide (4.5 ml.) is added. The mixture is filtered, the solids washed well with ether, and the combined filtrates evaporated to give a white solid. The solid is recrystallized from a mixture of pentane (50 ml.) and ether (25 ml.). The resulting white solid is homogeneous on 20% FFAP at 200° C.; M.P. 68–69° C.;

ir (CHCl$_3$) $^{3620}_{3460}$ cm.$^{-1}$ (OH)

nmr(CDCl$_3$) $\tau$ 8.3 (S, 1, O$\underline{H}$), 7.0 (AB q, 4, J$_{AB}$=16 Hz., C$\underline{H}_2$—CHOH—C$\underline{H}_2$, each line of quartet further split, J=6 Hz. for downfield half and J=3 Hz. for upfield half of quartet), 5.4 (multiplet, 1, C$\underline{H}$OH), and 2.9 (S, 4, aromatic hydrogens).

(b) 4,5,6,7-tetrahydro-2-indanol: Lithium (1.44 g., 2.1×10$^{-1}$ mol.) is added to a stirred mixture of n-propylamine (65 ml.) and 2-indanol (2.5 g., 1.86×10$^{-2}$ mol.) and the resultant mixture is stirred for 22 hours. Solid ammonium chloride is added until no further reaction occurs. This is followed by the addition of water (100 ml.) and ether (100 ml.). The layers are separated and the organic layer dried (MgSO$_4$) and evaporated to give a red liquid. Distillation yields a pink liquid [B.P. 110–114° C./11 mm.] which is sublimed twice and the resultant solid recrystallized twice from hexane to yield a solid: greater than 95% pure on 20% FFAP at 200° C.; M.P. 49–50.5° C.;

ir(CHCl$_3$) $^{3610}_{3440}$ cm.$^{-1}$ (OH)

nmr(CDCl$_3$) $\tau$ 7.2–8.4 (complex area, 13), and 5.6 (complex multiplet, 1, CH$_2$—C$\underline{H}$OH—CH$_2$).

(II) 3-coumaranols: A preferred class of compounds for use in the practice of the instant invention is prepared by the reaction of salicylaldehyde or a 5-substituted salicylaldehyde with dimethyloxosulfonium methylide to secure the corresponding 3-coumaranol in accordance with the method described by B. Holt and P. A. Lowe, Tetrahedron Letters, #7, 683 (1966) as detailed by E. J. Corey and M. Chaykovsky J. Amer. Chem. Soc., 87, 1353 (1965). The following coumaranols were prepared in this manner.

(a) 3-coumaranol: According to the procedure of Corey and Chaykovsky, a nitrogen blanketed mixture of 2.52 g. (0.09 mol.) of sodium hydride (as a 61% mineral oil dispersion) and 14.1 g. (0.064 mol.) of trimethyloxosulfonium iodide was stirred and treated dropwise over 15 min. with 70 ml. of dry dimethyl sulfoxide. The reaction mixture was then cooled to 10° C. and a solution of 7.32 g. (0.06 mol.) of salicylaldehyde in 30 ml. of dry dimethyl sulfoxide was added in one portion with stirring. After 5 min. the cooling bath was removed and stirring was continued at room temperature for 2 hours and at 50° C. for 1 hour. The cooled reaction mixture was poured into ice water and the aqueous mixture extracted with ether. The combined ether extracts were washed twice with water, once with saturated salt solution, and dried over magnesium sulfate. Evaporation of the solvent at reduced pressure yielded 7.2 g. (88%) of 3-coumaranol.

(b) 5-methoxy-3-coumaranol: 1.26 g. (0.045 mol.) of sodium hydride (as a 61% mineral oil dispersion) and 7 g. (0.032 mol.) of trimethyloxosulfonium iodide in 35 ml. of dry dimethyl sulfoxide was treated with a solution of 4.56 g. (0.030 mol.) of 5-methoxysalicylaldehyde in 15 ml. of dimethyl sulfoxide. Chromatographic purification gave 1.6 g. (32%) of 5-methoxy-3-coumaranol: ir(neat) 2.98, 3.4, 6.73, 8.8, 9.74, 10.4$\mu$; nmr(CCl$_4$) $\tau$ 2.3–3.5 (multiplet, aromatic) 4.92 (multiplet, —C$\underline{H}$OH), 5.72 (multiplet, —C$\underline{H}_2$—), 6.4 (singlet, —OC$\underline{H}_3$), 7.2 (singlet, —OH).

(III) Preparation of alcohols having unsaturated linkages extending from the cyclopentyl ring structure is by the derivatization of certain commercially available materials as follows:

(a) Allethrolone

Step 1.—Allethrin semicarbazone: The procedure described by La Forge et al., J. Org. Chem., 19, 457 (1954), was employed. A solution of 21.2 g. of allethrin (obtained as 20% solution in kerosene from Fairfield Chemical and purified as described by Barthel et al., Soap, 20 (7), 121 (1944), in 72 ml. EtOH and 8 ml. pyridine was treated with a solution of 10 g. of semicarbazide hydrochloride in 12 ml. H$_2$O. The resulting solution was allowed to stand at room temperature 50 hours. The EtOH was removed at reduced pressure and the resultant aqueous residue was added to water and extracted with ether. The combined ether extracts were washed with 5% HCl followed by brine until neutral. The ethereal extract was dried (MgSO$_4$) and concentrated to yield 25.1 g. (100%) of light yellow taffy-like gum which was pure enough for further reactions.

Step 2.—Allethrolone semicarbazone: A solution of 25.1 g. of crude allethrin semicarbazone in 75 ml. of MeOH under an N$_2$ atmosphere was cooled to 0° C. in an ice bath and treated with a solution of 4.35 g. of sodium methoxide in 75 ml. MeOH. The reaction was stored in the refrigerator 6 days and subsequently filtered to afford 15 g. of solid. An additional 3 g. was obtained by removing most of the solvent and cooling overnight. The total solid was recrystallized from EtOH/TtOAc to yield 9.90 g. (68%) M.P. 190–5° C. and 0.7 g. (5%) M.P. 190–5° C. This material was found suitable for further use.

Step 3.—Allethrolene (5): A mixture of 10.6 g. of allethrolone semicarbazone and 58 g. of KHSO$_4$ in 117 ml. H$_2$O and 77 ml. ether was stirred under a nitrogen atmosphere for 24.5 hours. The layers were separated and the aqueous layer washed several times with ether. The combined ether extracts were washed once with brine, dried (MgSO$_4$), concentrated, and distilled giving 6.96 g. of allethrolone: B.P. 93–95° C. (0.01 mm.); $n_D^{23.5}$ 1.5120; IR (neat) 2.93, 3.42, 5.87, 6.05, 7,21$\mu$; nmr (CDCl$_3$) $\tau$ 4.30 (m, 1, —CH$_2$—C$\underline{H}$=CH$_2$), 5.1 (m, 4, —C$\underline{H}$O$\underline{H}$, —C$\underline{H}_2$CH=C$\underline{H}_2$), 7.10 (d, 2, J=6 Hz, —C$\underline{H}_2$—CH=CH$_2$), [7.3 (3, 1, J=6 Hz.), 7.7 (s, 1) CH$_2$CO], 7.9 (s, 3, =CH—C$\underline{H}_3$). Glc analysis showed allethrolone to be >95% pure. Nmr was found to be in agreement with the literature spectrum.

(IV) 5-benzyl-3-furfuryl methanol: A detailed description for the preparation of this alcohol is described by M. Elliott et al., Nature, 213, 493 (1967), incorporated herein by reference.

Preparation of the compounds of this invention is accomplished by esterification of 3-(2,2-tetramethylene ethenyl)-2,2-dimethylcyclopropanecarboxylic acid or an acid halide thereof with an alcohol. The esterification step of the present invention can be effected in various ways. The alcohol can be heated with the carboxylic acid in the presence of a strong acid, such as an aromatic sulfonic acid or sulfuric acid, in an organic solvent capable of azeotropically boiling with water, thereby removing the water formed in the esterification. The alcohol can also be heated with a lower alkyl ester of the carboxylic acid in the presence of a basic catalyst such as sodium hydroxide, potassium hydroxide, sodium alcoholate, or potassium alcoholate, and the like, continuously removing the lower alcohol formed through transesterification of the reaction system. In such case, methyl, ethyl, n-propyl and iso-propyl esters are suitable. In the most preferable esterification, the alcohol is treated with the carboxylic acid halide in an inert organic solvent, preferably in the presence of an agent such as pyridine, triethylamine and other suitable amines, such that the esterification proceeds with the isolation of a hydrohalic acid salt within a short period of time. For this purpose, the acid chloride is the most preferred, though the acid bromide and the acid iodide can be employed. Preparation of 3 - (2,2 - tetramethylene ethenyl) - 2,2 - dimethylcyclopropanecarboxylic acid chloride by reaction with thionyl chloride, along with the final esterification reaction leading to one of the preferred compounds of this invention, is illustrated by Example I.

EXAMPLE I

Step 1.—Trans - 3 - (2,2 - tetramethylene ethenyl)-2,2 - dimethylcyclopropanecarboxylic acid chloride: A solution of 4.4 g. of the parent acid prepared as described supra in hexane was converted to its acid chloride by refluxing with an excess of $SOCl_2$ in n-hexane for 5 hours in an $N_2$ atmosphere. Distillation yielded 3.82 g. (90%) of colorless acid chloride: B.P. 74–77° C. (0.26 mm.) IR(neat) 3.4, 5.6, 9.45μ.

Step 2.—Ester of trans - 3 - (2,2 - tetramethylene ethenyl) - 2,2 - dimethylcyclopropanecarboxylic acid and allethrolone: A mixture of 3.82 g. of 3 - (2,2 - tetramethylene ethenyl) - 2,2-dimethylcyclopropanecarboxylic acid chloride in 16 ml. benzene and 2.85 g. pyridine was treated with 3 g. of allethrolone in benzene solvent at 0° C., rising thence to room temperature for 24 hours, all under an $N_2$ blanket. Work up from saturated $NaHCO_3$, drying ($MgSO_4$) and concentration yielded 5.94 g. (100%) of desired ester: IR (neat) 3.38, 5.77, 5.82, 8.7μ; nmr ($CCl_4$) τ 4.4 (m, 2, C$\underline{H}$O— and —C$\underline{H}$=$CH_2$), 5.1 (m, 3, —CH=C$\underline{H}_2$ and —C$\underline{H}$=), 7.1 (d, 2, J=6 Hz., —C$\underline{H}_2$—CH=), 8.05 (s, 3, =CH—C$\underline{H}_3$), 8.8 and 8.88 [2s, 6, >C(C$\underline{H}_3$)$_2$]; mass spectrum parent ion, m/e 328.

EXAMPLE II

2 - indanyl ester of trans - 3 - (2,2 - tetramethylene ethenyl) - 2,2 - dimethylcyclopropanecarboxylic acid: Substitution of an equimolar amount of 2-indanol, prepared as hereinbefore described, for the allethrolone of Example I, Step 2, results in the formation of the 2-indanyl ester of trans - 3 - (2,2 - tetramethylene ethenyl)-2,2-dimethylcyclopropanecarboxylic acid.

EXAMPLE III

Hydrogenated 2-idanyl ester of trans - 3 - (2,2 - tetramethylene ethenyl) - 2,2 - dimethylcyclopropanecarboxylic acid: Substitution of an equimolar amount of 4,5,6,7-tetrahydro - 2 - indanol, prepared as hereinbefore described, for the allethrolone of Example I, Step 2, results in the formation of the 4,5,6,7-tetrahydro-2-indanyl ester of trans - 3 - (2,2 - tetramethylene ethenyl) - 2,2 - dimethylcyclopropanecarboxylic acid.

EXAMPLE IV

3 - coumaranyl ester of trans - 3 - (2,2 - tetramethylene ethenyl) - 2,2 - dimethylcyclopropanecarboxylic acid: Substitution of an equimolar amount of 3-coumaranol, prepared as hereinbefore described, for the allethrolone of Example I, Step 2, results in the formation of the 3-coumaranyl ester of trans-3-(2,2-tetramethylene ethenyl)-2,2-dimethylcyclopropanecarboxylic acid.

EXAMPLE V 5-benzyl - 3 - furfuryl methanol ester of trans - 3 - (2,2-tetramethylene ethenyl) - 2,2 - dimethylcyclopropanecarboxylic acid: Substitution of an equimolar amount of 5 - benzyl - 3 - furfuryl methanol, prepared as hereinbefore described, for the allethrolone of Example I, Step 2, results in the formation of the 5-benzyl-3-furfuryl methanol ester of trans-3-(2,2-tetramethylene ethenyl)-2,2-dimethylcyclopropanecarboxylic acid.

EXAMPLE VI 5-ethyl-2-indanyl ester of trans-3 - (2,2-tetramethylene ethenyl)-2,2-dimethylcyclopropanecarboxylic acid: Substitution of an equimolar amount of 5 - ethyl-2-indanol, prepared as hereinbefore described, for the allethrolone of Example I, Step 2, results in the formation of the 5-ethyl-2-indanyl ester of trans-3-(2,2-tetramethylene ethenyl)-2,2-dimethylcyclopropanecarboxylic acid.

EXAMPLE VII 5-methoxy-3-coumaranyl ester of trans-3 - (2,2 - tetramethylene ethenyl) - 2,2-dimethylcyclopropanecarboxylic acid: Substitution of an equimolar amount of 5-methoxy-3-coumaranol, prepared as hereinbefore described, for the allethrolone of Example I, Step 2, results in the formation of the 5-methoxy-3-coumaranyl ester of trans-3-(2,2-tetramethylene ethenyl) - 2,2 - dimethylcyclopropanecarboxylic acid.

EXAMPLE VIII 5-nitro-2-indanyl ester of trans-3 - (2,2-tetramethylene ethenyl) - 2,2-dimethylcyclopropanecarboxylic acid: Substitution of an equimolar amount of 5-nitro-2-indanol, prepared as hereinbefore described, for the allethrolone of Example I, Step 2, results in the formation of the 5-nitro-2-indanyl ester of trans-3 - (2,2 - tetramethylene ethenyl)-2,2-dimethylcyclopropanecarboxylic acid.

EXAMPLE IX 5-chloro-3-coumaranyl ester of trans-3-(2,2-tetramethylene ethenyl)-2,2-dimethylcyclopropanecarboxylic acid: Substitution of an equimolar amount of 5-chloro-3-coumaronal, prepared as hereinbefore described, for the allethrolone of Example I, Step 2, results in the formation of the 5-chloro-3-coumaranyl ester of trans-3 - (2,2-tetramethylene ethenyl) - 2,2-dimethylcyclopropanecarboxylic acid.

EXAMPLE X

Cinerolone ester of trans - 3-(2,2-tetramethylene ethenyl) - 2,2-dimethylcyclopropanecarboxylic acid: Substitution of an equimolar amount of cinerolone, prepared as hereinbefore described, for the allethrolone of Example I, Step 2, results in the formation of the cinerolone ester of trans-3 - (2,2 - tetramethylene ethenyl)-2,2-dimethylcyclopropanecarboxylic acid.

EXAMPLE XI 5-amino-2-indanyl ester of trans - 3-(2,2-tetramethylene ethenyl) - 2,2-dimethylcyclopropanecarboxylic acid: Substitution of an equimolar amount of 5-amino-2-indanol, prepared as hereinbefore described, for the allethrolone of Example I, Step 2, results in the formation of the 5-amino-2-indanyl ester of trans-3-(2,2-tetramethylene ethenyl)-2,2-dimethylcyclopropanecarboxylic acid.

EXAMPLE XII 5-phenyl-3-coumaranyl ester of trans-3-(2,2-tetramethylene ethenyl)-2,2-dimethylcyclopropanecarboxylic acid: Substitution of an equimolar amount of 5-phenyl-3-coumaranol, prepared as hereinbefore described, for the allethrolone of Example I, Step 2, results in the formation of the 5-phenyl-3-coumaranyl ester of trans-3-(2,2-tetramethylene ethenyl) - 2,2-dimethylcyclopropanecarboxylic acid.

In each of the foregoing examples, the mixture of the cis and trans isomers of the acid chloride of 3-(2,2-tetramethylene ethenyl) - 2,2-dimethylcyclopropanecarboxylic acid is substituted for the trans isomer, yielding mixtures of the cis and trans esters of Examples I through XII.

While the novel esters of the present invention are all insecticidal and effective in controlling insect infestation, the following compounds are preferred for their superior insecticidal properties:

The 2-indanyl ester of trans-3-(2,2-tetramethylene ethenyl) - 2,2-dimethylcyclopropanecarboxylic acid: the 3-coumaranyl ester of trans-3-(2,2-tetramethylene ethenyl)-2,2-dimethylcyclopropanecarboxylic acid: the 5-benzyl-3-furfuryl methanol ester of trans-3-(2,2-tetramethylene ethenyl)-2,2-dimethylcyclopropanecarboxylic acid: and the allethrolone ester of trans-3-(2,2-tetramethylene ethenyl)-2,2-dimethylcyclopropanecarboxylic acid.

The dextrorotatory and levorotatory forms of the ester conformers, and the racemates thereof, are embodiments of the present invention.

The novel compounds of this invention have superior properties relative to corresponding chrysanthemic acid esters, which is believed to be due to enhanced resistance to detoxification achieved by modification of the isobutylene system of pyrethrin-like insecticides. Example XIII below demonstrates the markedly enhanced insecticidal activity of the esters of this invention relative to esters of chrysanthemic acid. A comparison of the insecticidal activity with that of pyrethrum is also presented.

EXAMPLE XIII

Insecticidal compositions comprising the allethrolone ester of trans-3 - (2,2-tetramethylene ethenyl)-2,2-dimethylcyclopropane carboxylic acid from Example I, dissolved in acetone and dispersed in distilled water with Triton X–100[1] emulsifier. Similar compositions comprising pyrethrum and cis-trans-allethrin, respectively, were also prepared. These compositions were separately applied for a ten second period to houseflies retained in a 2" x 5" diameter screened cage. The sprays were applied from the Waters vertical spray tower operating at 10 p.s.i. and discharging about 30 ml. of material per minute through an atomizer. The spray descends through an 8" stainless steel cylinder to test insects below the atomizer. The insects were retained in the sprayed cages for mortality observations. Test compositions having the indicated percentage concentration of weight (w.) of test compound to spray volume (v.) were utilized in the tests. The results are set forth in Table 1 below.

TABLE 1.—HOUSEFLY TESTS—KNOCK-DOWN AND KILL

| Ester | Percent w./v. | Average percent Knock-down (10 minutes) | Mortality (24 hours) |
| --- | --- | --- | --- |
| Trans-3-(2, 2-tetramethylene ethenyl)-2, 2-dimethylcyclopropane carboxylic acid, allethrolone ester | 0.001 | 41 | 3 |
| Pyrethrum | 0.001 | 10 | 1 |
| Cis-trans-allethrin | 0.001 | 0 | 2 |
| Piperonyl butoxide (PB) [1] | 0.1 | 0 | 3 |
| Trans-3-(2, 2-tetramethylene ethenyl)-2, 2-dimethylcyclopropane carboxylic acid, allethrolone ester | [1] 0.001+0.1 PB | 100 | 85 |
| Pyrethrum | [1] 0.001+0.1 PB | 100 | 81 |
| Cis-trans-allethrin | [1] 0.001+0.1 PB | 60 | 21 |
| Untreated Controls | | 0 | 0 |

[1] Piperonyl butoxide (PB), an insecticidal synergist, has essentially no insecticidal activity at the concentrations reported above.

As can be seen from the foregoing example, a representative compound of this invention possesses excellent insecticidal properties. Additionally, the compounds of the instant invention are substantially less toxic to mammals than are most common insecticides.

Similar results are secured when each of the esters of Examples II through XII is incorporated in the insecticidal composition of Example XIII in place of the allethrolone ester.

The compounds of the instant invention are insecticidally effective when tested against a wide variety of insects including the Southern army worm, the Mexican bean beetle, the pea aphid, the mite, the German cockroach, the adult mosquito, adult stable flies, black carpet beetle larva, webbing clothes moth larva, adult rice weevils, and adult sawtooth grain beetles, Insecticidal compositions containing the esters of the present invention can be formulated and utilized as oil solutions, emulsifiable concentrates, wettable powders, dusts, aerosols, or impregnated into wood, fabrics, etc., and provide a long lasting residual effect. Such compositions can include the generally employed carriers or diluents and auxiliary agents which are well-known to those skilled in the art. For example, suitable dusts can be prepared by admixing the compounds of the invention with dry free-flowing powders such as clay, bentonite, fuller's earth, diatomaceous earth, pyrophyllite, attapulgite, calcium carbonate, chalk or the like. The active compounds of the invention normally comprise up to about 10% by weight of such dust formulations. An amount of up to about 3% is preferred and is suitable for most applications.

Likewise, suspensions or dispersions of the compounds in a non-solvent, such as water, may be suitably employed for the treatment of foliage. Also suitably employed are solutions of the insecticides of the invention in oil which is emulsified in water. Examples of oil solvents include hydrocarbons such as benzene and toluene, halogenated hydrocarbons such as chlorobenzene, chloroform, fluorotrichloromethane and dichlorodifluoromethane, and commercial mixtures of hydrocarbons such as the common Stoddard solvents, petroleum ethers, and the like.

Aerosols can be prepared by dissolving compounds of the invention in a highly volatile liquid carrier such as trifluorochloromethane, nitromethane, dichlorodifluoroethane and the like, or by dissolving such compounds in a less volatile solvent, such as benzene or kerosene, and admixing the resulting solution with a highly volatile liquid aerosol carrier such as the polyfluorohydrocarbons commonly used as aerosol propellants.

The novel compounds of the invention are useful for destroying a variety of insects. Accordingly, a method aspect of the present invention comprises combating insects by applying to insects or to an insect habitat one or more of novel compounds of the invention.

Preferably the esters of this invention are employed in combination with a synergistic agent, for example, piperonyl butoxide, piperonyl sulfoxide, β-butoxy-β'-thiocyanodiethyl ether and the like.

What is claimed is:

1. A compound having the structure

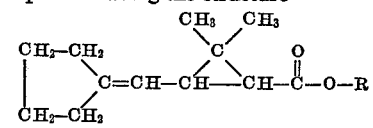

wherein R is a member selected from the group consisting of

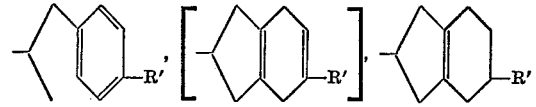

and

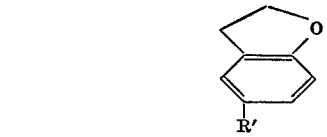

and R' is a member selected from the group consisting of hydrogen, chlorine, methyl, ethyl, propyl, methoxy, ethoxy, propoxy, phenyl, $NO_2$, and $NH_2$.

2. A compound in accordance with claim 1 which is a 2-indanyl ester of 3-(2,2-tetramethylene ethenyl)-2,2-dimethylcyclopropanecarboxylic acid.

3. A compound in accordance with claim 1 which is a hydrogenated 2-indanyl ester of 3-(2,2-tetramethylene ethenyl)-2,2-dimethylcyclopropanecarboxylic acid.

4. A compound in accordance with claim 1 which is a 3-coumaranyl ester of 3-(2,2-tetramethylene ethenyl)-2,2-dimethylcyclopropanecarboxylic acid.

5. A compound in accordance with claim 1 which is a 5-ethyl-2-indanyl ester of 3-(2,2-tetramethylene ethenyl)-2,2-dimethylcyclopropanecarboxylic acid.

6. A compound in accordance with claim 1 which is a 5 - methoxy - 3 - coumaranyl ester of 3 - (2,2 - tetramethylene ethenyl) - 2,2 - dimethylcyclopropanecarboxylic acid.

---

[1] Isooctyl phenyl polyethoxy ethanol OPE 9–10 supplied by Rohm & Haas Company.

7. A compound in accordance with claim 1 which is a 5-nitro-2-indanyl ester of 3-(2,2-tetramethylene ethenyl)-2,2-dimethylcyclopropanecarboxylic acid.

8. A compound in accordance with claim 1 which is a 5-chloro-3-coumaranyl ester of 3-(2,2-tetramethylene ethenyl)-2,2-dimethylcyclopropanecarboxylic acid.

9. A compound in accordance with claim 1 which is a 5-amino-2-indanyl ester of 3-(2,2-tetramethylene ethenyl)-2,2-dimethylcyclopropanecarboxylic acid.

10. A compound in accordance with claim 1 which is a 5-phenyl-3-coumaranyl ester of 3-(2,2-tetramethylene ethenyl)-2,2-dimethylcyclopropanecarboxylic acid.

References Cited

UNITED STATES PATENTS 3,538,143  11/1970  Matsui et al. _____ 260—468

OTHER REFERENCES

Elliot et al. Nature 213 (5075), 493-4 (1967).

HENRY R. JILES, Primary Examiner

G. T. TODD, Assistant Examiner

U.S. Cl. X.R.

260—468 P; 424—285, 306